United States Patent [19]

Rokutan

[11] Patent Number: 4,797,872
[45] Date of Patent: Jan. 10, 1989

[54] METHOD FOR REPRODUCING DATA RECORDED ON OPTICAL CARD

[75] Inventor: Takao Rokutan, Higashimurayama, Japan

[73] Assignee: Olympus Optical Co., Ltd., Japan

[21] Appl. No.: 84,844

[22] Filed: Aug. 13, 1987

[30] Foreign Application Priority Data

Aug. 15, 1986 [JP] Japan .................................. 61-190621

[51] Int. Cl.$^4$ .......................... G11B 7/00; G06K 7/10
[52] U.S. Cl. ...................................... 369/109; 369/44; 369/59; 235/454; 250/569
[58] Field of Search .......................... 369/59, 109, 44; 235/454, 455, 461, 487, 488, 462; 250/569, 570

[56] References Cited

U.S. PATENT DOCUMENTS

| | | | |
|---|---|---|---|
| 2,916,624 | 12/1959 | Angel et al. | 235/454 |
| 3,619,569 | 11/1971 | Hoehn et al. | 235/454 |
| 4,525,822 | 6/1985 | Nishimura | 369/59 X |
| 4,558,441 | 12/1985 | Yokota et al. | 369/59 |
| 4,599,717 | 7/1986 | Bracht et al. | 369/59 X |
| 4,650,979 | 3/1987 | Stockburger et al. | 235/455 |
| 4,740,675 | 4/1988 | Brosnan et al. | 235/462 |

FOREIGN PATENT DOCUMENTS 0156555 10/1985 European Pat. Off. .......... 369/59 X

*Primary Examiner*—William L. Sikes
*Assistant Examiner*—Brian M. Healy
*Attorney, Agent, or Firm*—Parkhurst, Oliff & Berridge

[57] ABSTRACT

In a method of reproducing data recorded on an optical card in such a manner that distances between successive pits are modulated in accordance with the data, the optical card and an optical reading device are moved relative to each other in a reciprocal manner to derive a read-out signal both in forward and backward movements, the polarity of the read-out signal is selectively inverted in accordance with the mutual relation between the write-in direction and the read-out direction, the read-out signal is converted into a bivalent signal, and a reproduced signal is derived from the bivalent signal in such a manner that front or rear edges of pits viewed in the write-in direction are always detected.

7 Claims, 4 Drawing Sheets

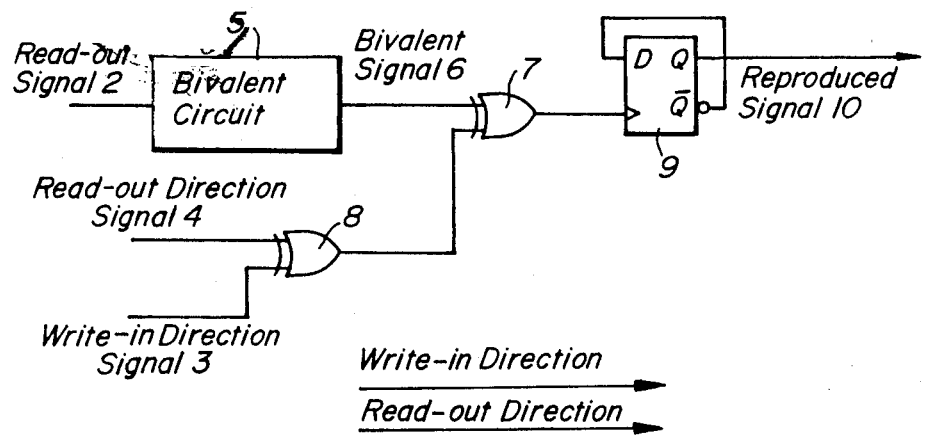

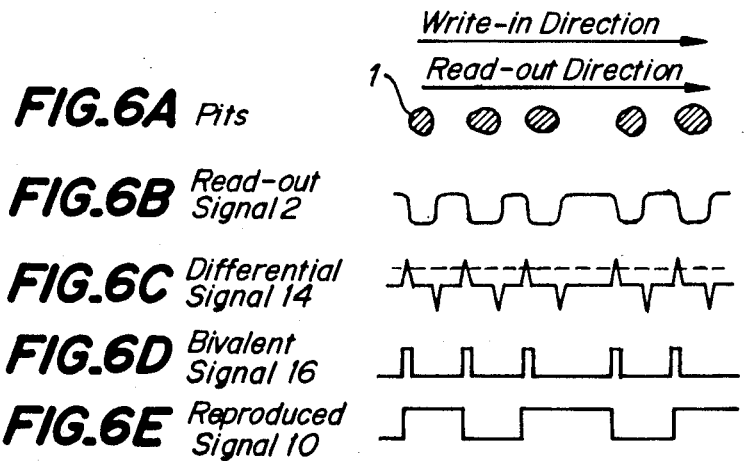
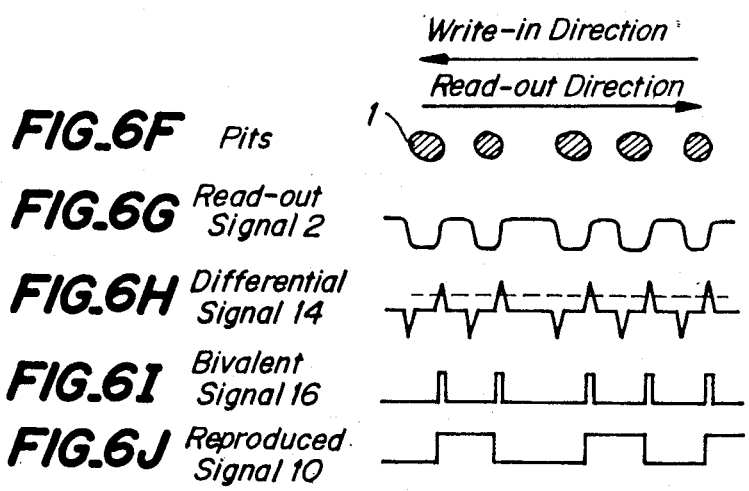

METHOD FOR REPRODUCING DATA RECORDED ON OPTICAL CARD

BACKGROUND OF THE INVENTION

Related Art Statements

This invention relates to a method for reproducing data recorded on an optical card.

In an optical card, data is recorded as arrays of pits whose pitches are modulated in accordance with the data. In case of reproducing the data thus recorded on the optical card, the optical card and a reading head are moved reciprocally relative to each other to derive output signals both in a forward movement and in a backward movement. In a known reproducing method described in U.S. Pat. No. 4,525,822 issued on June 25, 1985, distances between successive pits are detected by using front edges or rear edges of pits as a positional standard regardless of the direction of reciprocal movement.

In case of recording the data on the optical card, a shape of a pit recorded by a laser beam becomes asymmetrical at front and rear edges viewed in a write-in direction due to the property of record medium of the optical card. FIG. 1 shows a typical configuration of pits recorded on the optical card. In this example, rear edges of pits viewed in the write-in direction are widened. It should be noted that the rear edge means an edge which is recorded at a later timing. In FIG. 1, $r_1$, $r_2$, $r_3$ and $r_4$ denote distances between front edges of successive pits $P_1$, $P_2$, $P_3$, $P_4$ and $P_5$, respectively, and $t_1$, $t_2$, $t_3$, $t_4$ represent distances between rear edges of the pits $P_1$, $P_2$, $P_3$, $P_4$ and $P_5$, respectively. As explained above, when the rear edges fluctuate, the distances $t_1 \sim t_4$ include more jitter than $r_1 \sim r_4$.

In the known reproducing method, the front or rear edges of pits are detected regardless of the write-in direction. For instance, when front edges of pits viewed in the read-out direction are detected, in a forward movement in which a read-out direction is the same as the write-in direction, the distances $r_1 \sim r_4$ are detected so that the reproduced signal contains only a small jitter. However, in a backward movement in which the read-out direction is opposite to the write-in direction, the distances $t_1 \sim t_4$ are detected and thus relatively large jitter is introduced in the reproduced signal. Therefore, in the known reproducing method, the reproduced signal contains large jitter and the error rate becomes worse.

SUMMARY OF THE INVENTION

The present invention has for its object to provide a novel and useful method for reproducing data from an optical card, in which a reproduced signal having a small jitter can be always obtained both in the forward and backward movements and thus the error rate can be maintained low.

According to the invention, a method for reproducing data recorded on an optical card on which said data has been recorded by modulating distances between successive pits comprises the steps of:

moving the optical card and an optical reading device relative to each other in a reciprocal manner to derive a read-out signal; and processing said read-out signal to derive a reproduced signal by detecting distances between front or rear edges of pits viewed in a write-in direction of pits.

BRIEF DESCRIPTION OF THE DRAWINGS

FIG. 2 is a block diagram illustrating an embodiment of a data reproduction circuit for carrying out the data reproducing method according to the invention;

FIGS. 3A to 3H are time charts for explaining the operation of the data reproduction circuit illustrated in FIG. 2;

FIGS. 6A to 6J are time charts representing the operation of the data reproduction circuit shown in FIG. 5.

DESCRIPTION OF THE PREFERRED EMBODIMENTS

Figure 1:
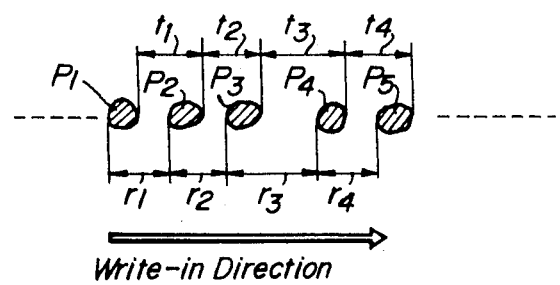
FIG. 1 is a schematic view showing a typical configuration of pits recorded on an optical card.

FIG. 2 is a block diagram showing a major part of an embodiment of a data reproduction circuit for carrying out the data reproducing method according to the invention. In the present embodiment, pits 1 having large fluctuation at their rear edges viewed in the write-in direction are to be reproduced. An optical reading device not shown in FIG. 2 comprises a light source for illuminating the optical card, a photodetector for receiving light reflected by the optical card and a driving device for moving the optical card and the photodetector relative to each other in a reciprocal manner. From the optical reading device, there are supplied a read-out signal 2, a write-in direction signal 3 for denoting the write-in direction and a read-out direction signal 4 for representing a read-out direction. The read-out signal 2 is converted into a bivalent signal 6 by a bivalent circuit 5 and the bivalent signal 6 is supplied to one input terminal of an exclusive OR circuit 7. The write-in direction signal 3 and read-out direction signal 4 are supplied to an exclusive OR circuit 8 and an output signal of the exclusive OR circuit 8 is supplied to the other input terminal of the exclusive OR circuit 7. An output of the exclusive OR circuit 7 is supplied to a clock input terminal of a D-flip-flop 9 and an inverted output terminal $\overline{Q}$ of the D-flip-flop 9 is supplied to a D input terminal of the D-flip-flop 9. Then a reproduced signal 10 is derived from a Q output terminal of the D-flip-flop 9.

Now the operation of the data reproduction circuit shown in FIG. 2 will be explained with reference to time charts illustrated in FIGS. 3A to 3H. FIGS. 3A to 3D illustrate a case in which the read-out direction is the same as the write-in direction. In this case, the write-in direction signal 3 and read-out direction signal 4 have the same logic level, so that the output of the exclusive OR circuit 8 becomes a logical low level. Therefore, the exclusive OR circuit 7 becomes non-inverted and the bivalent signal 6 is directly supplied to the clock input terminal of the D-flip-flop 9. Thus, there is obtained the reproduced signal 10 which has been divided by two by raising edges of the bivalent signal 6. Therefore, in this case the front edges of pits viewed in the write-in direction are detected to derive the reproduced output signal 10.

FIGS. 3E to 3H show the time charts in such a case that the read-out direction is in opposition to the write-in direction. In this case, the read-out direction signal 4 has a different logical level than the write-in direction signal 3, so that the output of the exclusive OR circuit 8 becomes a logical high level. Therefore, the exclusive OR circuit 7 becomes in an inverted operation, and an inversed signal of the bivalent signal 6 is supplied to the clock input terminal of the D-flip-flop 9. In this manner, there is obtained the reproduced signal 10 which has been divided by two by the trailing edges of the bivalent signal 6. Therefore, there is obtained the reproduced signal 10 by detecting the front edges of pits viewed in the write-in direction, i.e. the rear edges of pits viewed in the read-out direction.

Figure 4:
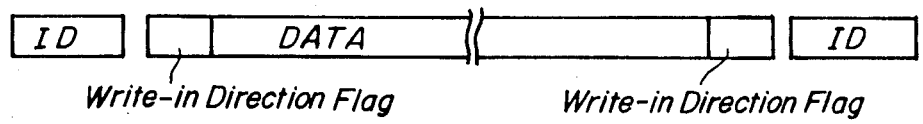
FIG. 4 is a schematic view showing an example of a data block format.

FIG. 4 is a schematic view depicting an example of a data block format recorded on the optical card. In this example, at both ends of the data block there are recorded a write-in direction flag consisting of a predetermined pattern. By reading-out the write-in direction flag pattern, there is produced the write-in direction signal 3.

In the embodiment so far explained, since the front edges of pits viewed in the write-in direction are always detected to derive the reproduced signal 10, the reproduced signal contains only a small jitter and the error rate can be decreased to a great extent.

Figure 5:
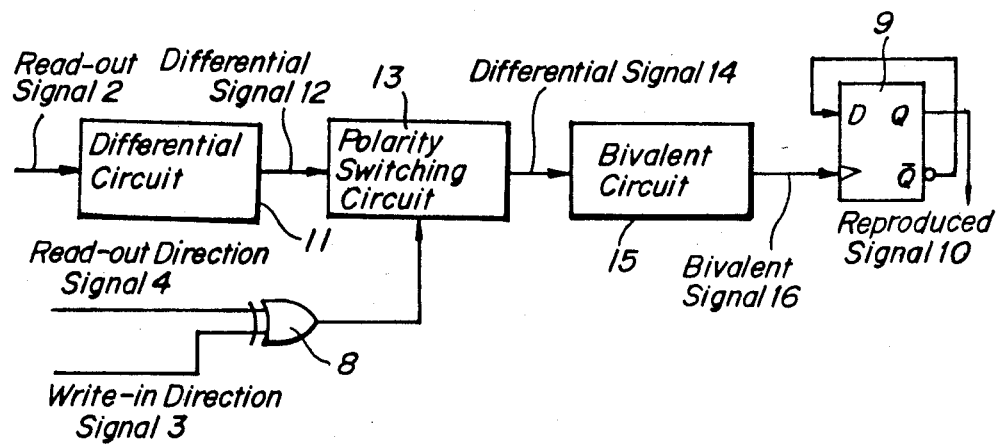
FIG. 5 is a block diagram depicting another embodiment of the data reproduction circuit according to the invention.

FIG. 5 is a block diagram illustrating another embodiment of the data reproduction circuit for performing the method according to the invention. In this embodiment, the read-out signal 2 is supplied to a differential circuit 11 to detect a differential signal 12 representing edges which is then supplied to a polarity switching circuit 13 which is driven by the output signal of an exclusive OR circuit 8 to which are supplied the write-in and read-out direction signals 3 and 4. The polarity switching circuit 13 supplies the differential signal 14 having a given polarity to a bivalent circuit 15 which converts the differential signal 14 into a bivalent signal 16. The bivalent signal 16 thus derived is supplied to a clock input terminal of a D-flip-flop 9 which generates at its Q output terminal a reproduced signal 10 which has been divided by two at raising edges of the bivalent signal 16. The polarity switching circuit 13 is constructed such that when the read-out direction is the same as the write-in direction, i.e. when the output of the exclusive OR circuit 8 has a logical low level, the polarity switching circuit 13 operates as a polarity inversion circuit, but when the read-out direction is in opposition to the write-in direction, i.e. when the exclusive OR circuit 8 generates the logical high level, the polarity switching circuit 13 operates as the non-inversion circuit. Therefore, when the polarity switching circuit 13 serves as the inversion circuit, the differential signal 14 becomes the inversion of the differential signal 12, and when the polarity switching circuit 13 operates as the non-inversion circuit, the differential signal 14 becomes identical with the differential signal 12.

FIGS. 6A to 6E are time charts showing the operation in which the read-out direction is the same as the write-in direction, and FIGS. 6F to 6J are time charts representing the operation in which the read-out is effected in a direction opposite to the write-in direction. As can be understood from these time charts, also in this embodiment, the front edges of pits viewed in the write-in direction are always detected both in the forward and backward movement, so that it is possible to obtain the reproduced signal 10 having a small jitter and the error rate can be reduced.

The present invention is not limited to the embodiments so far explained, but may be modified in various ways within the scope of the invention. For instance, if all the data is recorded on the optical card always in one direction, it is not necessary to provide the write-in direction flag in each data block. In such a case, the exclusive OR circuit 7 shown in FIG. 2 and the polarity switching circuit 13 illustrated in FIG. 5 may be directly controlled by the read-out direction signal 4. Further, in the above embodiments, the reproduced signal 10 is derived by detecting the front edges of pits viewed in the write-in direction, but if the front edges fluctuate much greater than the rear edges, it is possible to detect the rear edges of pits.

As explained above in detail, in the method according to the invention since the front or rear edges of pits viewed in the write-in direction are exclusively detected to derive the reproduced signal, it is possible to obtain the reproduced signal having a small jitter and thus, the error rate can be decreased materially.

What is claimed is:

1. A method for reproducing data recorded on an optical card on which said data has been recorded by modulating distances between successive pits comprising the steps of:
    moving the optical card and an optical reading device relative to each other in a reciprocal manner to derive a read-out signal; and
    processing said read-out signal to derive a reproduced signal by detecting distances between front or rear edges of pits viewed in a write-in direction of pits.

2. A method according to claim 1, wherein the reproduced signal is derived by detecting distances between the front edges of pits viewed in the write-in direction.

3. A method according to claim 1, wherein said reproduced signal is derived by detecting distances between rear edges of pits viewed in the write-in direction.

4. A method according to claim 1, wherein a read-out direction and the write-in direction are compared to derive a condition signal, and the polarity of the read-out signal is changed in accordance with said condition signal.

5. A method according to claim 4, wherein said write-in direction is detected by reading-out a write-in direction flag recorded at both ends of respective data blocks.

6. A method according to claim 4, wherein the read-out signal is converted into a bivalent signal, a read-out direction signal and a write-in direction signal are supplied to a first exclusive OR circuit whose output signal is supplied to a second exclusive OR circuit together with the bivalent signal, an output of the second exclusive OR circuit is supplied to a clock input terminal of a D-flip-flop whose Q output terminal is connected to a D input terminal, and the reproduced signal is derived from a Q output terminal of the D-flip-flop.

7. A method according to claim 4, wherein the read-out signal is supplied to a differential circuit to derive a differential signal, a read-out direction signal and a write-in direction signal are supplied to an exclusive OR circuit whose output is supplied as a control signal to a polarity switching circuit to which is supplied said differential signal to derive an inverted or non-inverted differential signal which is supplied to a bivalent circuit to derive a bivalent signal, said bivalent signal is supplied to a clock input terminal of a D-flip-flop whose Q̄ output terminal is connected to a D input terminal of the D-flip-flop, and said reproduced signal is derived from a Q output terminal of the D-flip-flop.

* * * * *